PHOTO-ETCHING PROCESS

Filed Oct. 30, 1967 2 Sheets-Sheet 1

INVENTOR.
TAKAYUKI YANAGAWA
BY
Hopgood & Calimafde
ATTORNEYS

PHOTO-ETCHING PROCESS

Filed Oct. 30, 1967

INVENTOR.
TAKAYUKI YANAGAWA

BY Hopgood & Calimafde
ATTORNEYS 3,576,630

PHOTO-ETCHING PROCESS

Takayuki Yanagawa, Tokyo, Japan, assignor to Nippon Electric Company Limited, Tokyo, Japan Filed Oct. 30, 1967, Ser. No. 679,143
Claims priority, application Japan, Oct. 29, 1966, 41/71,243
Int. Cl. G03c 5/00
U.S. Cl. 96—36 4 Claims

ABSTRACT OF THE DISCLOSURE

Broadly speaking, the disclosure relates to the use of a photo-etching process in the production of semiconductors wherein the surface of a semiconductor wafer is covered with a corrosion-resistant photosensitive coating. A window is made in the coating and the exposed part is thereafter chemically or electrically etched.

This invention relates to a photo-etching or photo-engraving process for surface processing.

The photo-etching process that has been widely used in the field of semiconductor industry comprises the steps of covering the surface of a semiconductor wafer with a corrosion-resistant photosensitive coating, making windows through the coating by use of photographic techniques, and chemically or electrically etching only the exposed parts of the surface.

It is an object of this invention to provide an improved process for removing a predetermined area of a thin film of one material from a substrate of a different material as preferably applied to the production of semiconductors.

Figure 1A:
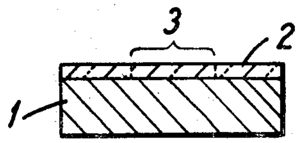
Figure 2A:
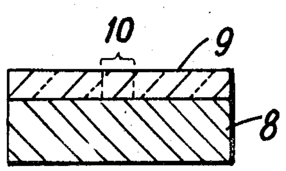
Figure 1B:
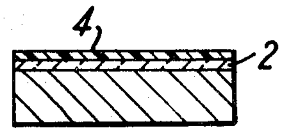
Figure 2B:
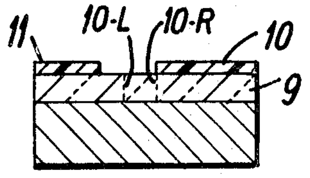
Figure 1C:
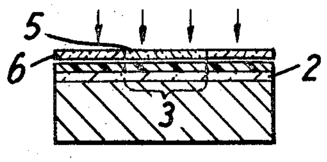
Figure 2C:
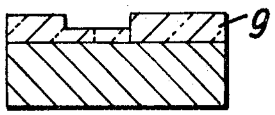
Figure 1D:
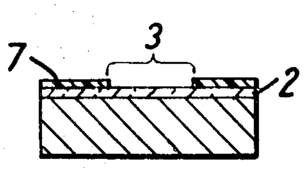
Figure 2D:
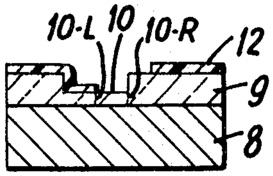
Figure 1E:
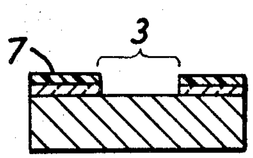
Figure 2E:
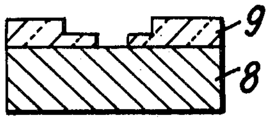
Figure 1F:
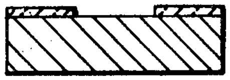
Figure 4A:
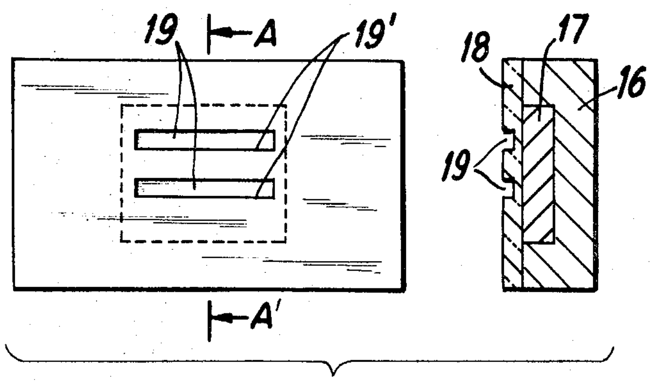
Figure 3A:
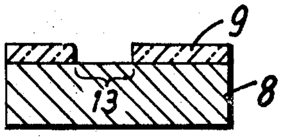
Figure 3B:
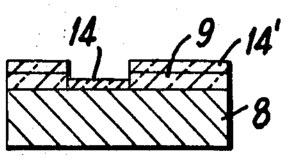
Figure 4B:
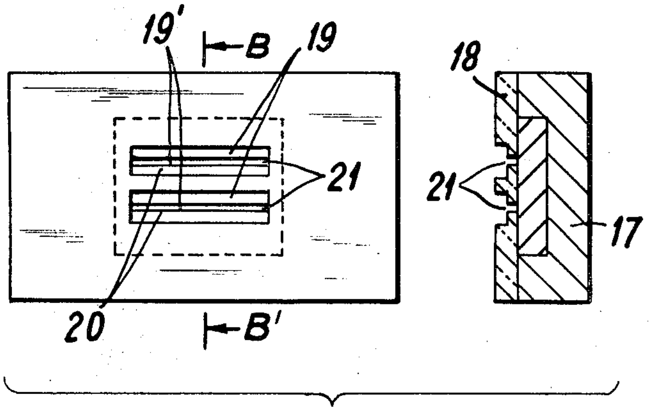
Figure 3C:
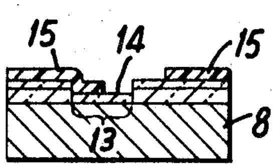
Figure 4C:
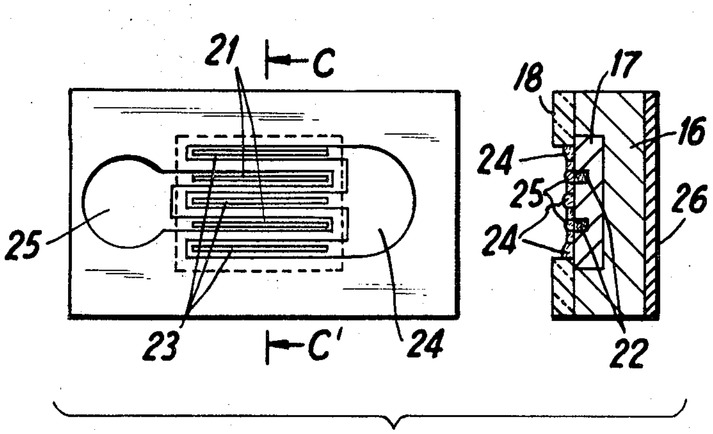
Figure 3D:
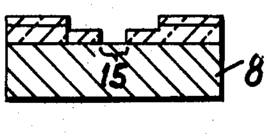

The foregoing and other objects will more clearly appear when taken in conjunction with the following disclosure and the accompanying drawing, wherein:

FIGS. 1(*a*) to 1(*f*) are cross-sectional views of a portion of a semiconductor wafer illustrating the sequential steps normally employed in using the photo-etching method;

FIGS. 2(*a*) to 2(*e*) are cross-sectional views of a portion of a semiconductor wafer illustrating the sequential steps employed in one embodiment of an improved process provided by the invention;

FIGS. 3(*a*) to 3(*d*) are cross-sectional views of a portion of a semiconductor wafer illustrating the sequential steps of another embodiment of an improved photo-etching process provided by the invention; and FIGS. 4(*a*) to 4(*c*) illustrate a part of the manufacturing steps of a silicon planar transistor in accordance with this invention showing plan views on the left and cross-sectional views on the right as taken along the lines A–A′, B–B′ and C–C′ looking in the direction of the arrows.

In order to aid in understanding the conventional photo-etching process, the following explanation is given with reference to FIGS. 1(*a*) through 1(*f*), where silcon dioxide film 2 formed over the surface of silicon 1 is selectively removed.

FIG. 1(*a*) is a sectional view of a silicon wafer 1 on which silicon dioxide film 2 is provided. The silicon dioxide film 2 is, for example, about one micron in thickness and is formed by thermal oxidation of the surface of the silicon wafer 1 as is commonly done in the manufacture of a silicon planar transistor. The adhesion of the oxide film 2 to the wafer 1 is excellent in such a structure. Area 3 of the silicon dioxide film 2 is the area desired to be removed by the photo-etching process. First of all, a photosensitive film 4 is applied to the entire surface of the silicon dioxide film 2 as shown in FIG. 1(*b*). The film is applied in a dark room. Examples of photosensitive material which may be used are Kodak Photo Resist (KPR), Kodak Metal Etch Resist (KMER), Kodak Photosensitive Lacquer (KPL), Kodak Thin Film Resist (KTFR), or the like made by Eastman Kodak Co., of the U.S.A., Tokyo Photo Resist (TPR) manufactured by Tokyo Ohka Kabushiki Gaisha, and the like can be used. As shown in FIG. 1(*c*), the photosensitive film 4 is then exposed to light through a glass mask 6 with an opaque portion 5 which serves to keep the underlying portion of the photosensitive film 4 on the surface area 3 unexposed. The opaque portion 5 which shuts out light is made by precipitating silver particles on a transparent glass plate, which is the same as the ordinary dry plate in photography.

The unexposed photosensitive film on the area 3 does not change in quality, but the exposed portion undergoes polymerization reaction and undergoes a change in properties. This process is commonly called "exposure." The light employed should be of a wavelength to which the photosensitive film is highly sensitive. For example, the materials exemplified in the above are especially sensitive to ultraviolet rays and therefore a mercury lamp may be used for exposure. Next, the unexposed portion of the photosensitive film is removed in an organic solvent (developer) that dissolves only the unpolymerized photosensitive film. This process is called "development," and FIG. 1(*d*) shows a state after development. As will be observed only the surface of area 3 of silicon dioxide film 2 is exposed, and the other portion is covered with a photosensitive film that has polymerized and become resistant to etching solution. Thereafter, the exposed silicon dioxide area is dipped in an etching solution which corrodes only the silicon dioxide and not the silicon substrate or the photosensitive film. One example of an aqueous solution is ammonium fluoride ($NH_4F$) which only removed the exposed silicon dioxide. This step is shown in FIG. 1(*e*). By subsequently removing the photosensitive film 7 remaining on the surface by such appropriate methods as mechanical scrapping, a desired structure is obtained as shown in FIG. 1(*f*). Alternative to the above example, there are different types of photoresist processes, wherein the exposed parts can be dissolved in a developer and wherein the unexposed parts are not removed. In this case, the mask of reversed construction is used for the exposure step, wherein a transparent portion is used in place of the opaque portion 5 as shown in FIG. 1(*c*) and vice versa, and otherwise the process is substantially the same as that shown in FIGS. 1(*a*) to 1(*f*).

The process of selectively removing silicon dioxide film from a silicon substrate as shown in FIGS. 1(*a*) and 1(*b*) is commonly used in the fabrication of silicon planar devices. In order to change the conductivity or conductivity type of a limited region of a silicon substrate by selectively diffusing impurities into the silicon surface, a silicon dioxide film is used as a mask to limit the diffusion to the exposed area in accordance with a desired pattern. Prior to diffusion, the surface of the silicon substrate is first covered with a silicon dioxide film except for the limited area into which the impurities are to be diffused as shown in FIG. 1(*f*). The treated silicon is then put into a diffusion furnace to diffuse the impurities only into the exposed surface. The area into which the impurity is to be diffused is determined by the peripheral shape of the silicon dioxide film (this is usually called "window"), and the window is determined by the pattern of dark portion of the glass mask. This pattern is formed by taking a picture of a hand-worked original pattern on a glass dry plate. The glass dry plate thus obtained is used as a glass mask in the exposure process shown in FIG. 1(*c*). The original pattern can be reduced on the glass plate using an adequate optical system, so that complex and minute figures can be obtained.

It is important to make a small window through the silicon dioxide film especially in the fabrication of such semiconductor devices as integrated circuits and UHF transistors.

For example, in UHF silicon transistors which require very small emitter area, emitter impurities are diffused through a window of silicon dioxide film. Thus, the emitter area is determined by the area of the window. As reported in a paper entitled "Structure-determined Gain-band Product of Junction Transistors Triode," by J. E. Early, Proceedings of the IRE, December 1958, pages 1924–1927, the gain-band product which is used as a figure of merit of the high frequency performance is inversely proportional to the width of a rectangular emitter. Therefore, it is an important technique to make a window with as narrow a width as possible through the silicon dioxide film in the fabrication of UHF transistors. Also, in case of insulated gate field effect transistors (MOS transistors), the gate area should be made as small as possible while keeping the gate length long in order to improve the high frequency characteristics. This means narrowing of the gate width and here again, a long window with narrow width is required. Further, in the case of semiconductor integrated circuits, circuit elements to be formed in a single semiconductor slice should be made as small as possible in order to improve the density of integration, and here again a technology to make a small window is required. For example, a narrow diffused resistor is sometimes desired not only because of its compactness but also because of its decreased parasitic capacitance. In such an instance, it is essential to have a narrow window.

One of the factors that determines a minimum width of a long and narrow window cut through a silicon dioxide film is the dimension of the dark portion (i.e. completely opaque portion) of a glass mask. The dark portion of the glass mask must completely cut off light, but some semi-transparent portions will inevitably exist at the boundary of the dark and transparent portions. Accordingly, as the width of the dark portion is narrowed, the semi-transparent portions at two opposite sides of the dark portion get nearer and finally come into contact with each other, with the result that the dark portion disappears. Therefore, the minimum width that can be realized is about two times larger than the width of the semi-transparent portion.

Another major factor which determines the minimum width of a window is the thickness of the photo-resist (photosensitive) film. To be more specific, in the exposure process, a glass mask is pressed hard against the surface of the photosensitive film, but since the photosensitive resin has a finite thickness, light enters underneath the dark portion of the glass mask by diffraction effect as it passes through the photosensitive film. In this case, the boundary of a window of silicon dioxide film does not appear clearly, and an average width of the window tends to increase.

Still another factor responsible for the minimum width of a window is the thickness of silicon dioxide film. For example, if the silicon wafer shown in FIG. 1(*d*) is dipped into an etching solution, the solution attacks horizontally the silicon dioxide film underlying the photo-resist film 7 from the edge of area 3. When the condition shown in FIG. 1(*e*) has been attained, expansion in a horizontal direction becomes approximately equal to the thickness of silicon dioxide film, and causes an enlargement of the window.

The foregoing problems are overcome with the improved photo-etching method provided by the invention.

According to the method of the invention, the surface of a thin film formed on a substrate is covered with a photo-resist film, except for an area which determines a part of the boundary of a predetermined area from which the thin film is to be removed and which contains the remaining boundary of the predetermined area. Next, the thin film of the uncovered area is made thinner than the other. In other words, the thin film is provided with a recess at the uncovered area. Formation of the thinner film or the recess may be carried out either by stopping the etching of the uncovered thin film portion before it is completely removed or by depositing a thinner film after the uncovered portion has been entirely removed. After the photo-resist film is removed, the other area of the surface of the thin film so transformed is again covered with a photo-resist film on an area which determines the above-mentioned remaining boundary of the predetermined area and which contains the boundary having been already determined at the predetermined area, followed by etching the thin film of the uncovered area to such an extent that the thinner film belonging to the uncovered area is entirely removed.

This invention will be more clearly understood from the following preferred embodiments of the invention, when taken in conjunction with FIGS. 2 to 4.

FIGS. 2(*a*) through 2(*e*) are a series of figures illustrating an embodiment of the invention depicting the successive steps employed. FIG. 2(*a*) is a sectional view of a silicon substrate 8 with a silicon dioxide film 9 formed thereon. The invention is to be applied to remove a portion 10 of silicon dioxide film 9 and to expose the surface of substrate 8 underlying this portion 10. First of all, as shown in FIG. 2(*b*), the oxide film is covered with photo-resist film 11 with an area being exposed that is adjacent to one boundary 10–R of area 10 of silicon dioxide film 9 and which also includes the other boundary 10–L. The coated silicon is then immersed in an aqueous solution of ammonium fluoride ($NH_4F$), and about one-half of the thickness of the exposed area of silicon dioxide film 9 is removed therefrom, as shown in FIG. 2(*c*). The process from FIG. 2(*a*) to FIG. 2(*c*) may be actually carried out according to the same sequence as that of the process shown in FIGS. 1(*a*) through 1(*f*). Next, as shown in FIG. 2(*d*), the oxide film 9 is again covered with photo-resist film 12, with a portion of the oxide film exposed adjacent to the other boundary 10–L of area 10 of the silicon dioxide film, that is including boundary 10–R. The silicon wafer is then immersed again in an ammonium fluoride solution ($NH_4F$) to etch the silicon dioxide film until area 10 is entirely removed. Although the exposed area on the right side of area 10 is also etched, it is the surface of silicon substrate 8 underlying the area 10 that is exposed first since area 10 is thinner. By stopping the etching at this point, the exposed silicon substrate below area 10 is obtained as shown in FIG. 2(*e*). The steps shown in FIGS. 2(*c*) to 2(*e*) may be performed in the same sequence as that shown in FIGS. 1(*a*) through 1(*f*).

A structure similar to the above can be achieved by utilizing the embodiment shown in FIGS. 3(*a*) through 3(*d*). FIG. 3(*a*) shows the silicon substrate 8 with the oxide film 9, which is obtained by immersing the silicon substrate with the oxide and photo-resist films in an aqueous solution of ammonium fluoride ($NH_4F$), using the manufacturing step shown in FIG. 2(*b*). The photo-resist film is removed to expose a portion 13 of the substrate surface. Next, a new silicon dioxide film 14 is formed or grown on the exposed silicon surface 13 by oxidation. In this case, a new silicon dioxide film 14' also grows on the original silicon dioxide film 9. This condition is shown in FIG. 3(*b*). If desired, the new silicon dioxide film 14 may be otherwise made by pyrolytic deposition of silicon dioxide. The thickness of this new silicon dioxide film 14 should be advantageously less than about a half of the total combined thickness of the original silicon dioxide film 9 and the new silicon dioxide film 14' formed thereon. Next, as shown in FIG. 3(*c*), the surface of the silicon dioxide film is selectively covered with photo-resist film in such a manner that the area containing one boundary (the right side on the figure) of the original silicon dioxide film 9 is exposed. The silicon dioxide is then etched in an aqueous solution of ammonium fluoride until the new silicon dioxide 14 is completely removed. Since the silicon dioxide film on the surface other than the area 13 is thicker than the new silicon dioxide film 14, the former is not completely removed. As a result of the foregoing method, the silicon wafer is obtained as shown in FIG. 3(*d*) with only the small surface area 15 exposed and with the other surface area covered with silicon dioxide film.

As is clearly seen from the above two embodiments of the invention, each side of the boundary of the area from which the silicon dioxide film is to be removed is formed one after another, and a boundary can be determined by adjusting it in accordance with the other boundary formed in the first process, with the result that the adverse affect of semi-transparent portion adjacent to the dark portion of glass mask, the diffraction effect of light, and the under-cutting effect is restricted to only one side.

Further, according to this invention, it is possible to control the removal of the silicon dioxide film so as to form a simple rectangular shape, even in cases where there is no glass mask of the same size. For instance, in an experiment conducted with regard to the invention, a rectangular window of 1 micron in width and 80 microns in length could be formed through the silicon dioxide film of 0.8 micron in original thickness, by using a glass mask having a rectangular dark portion of 12 microns in width and 80 microns in length.

FIGS. 4(*a*) through 4(*c*) show an embodiment wherein the invention is applied to the formation of a silicon dioxide film mask for the emitter diffusion of silicon planar transistors. In each drawing, a plan view is shown on the left, and a cross-sectional view on the right. Referring to FIG. 4(*a*), a base region 17 has been formed in a silicon substrate 16, which serves as a collector, by the selective diffusion of an impurity, the surface of the substrate being then covered with a silicon dioxide film 18 which in turn has been provided with two rectangular recesses 19 on the base region 17. Each of the rectangular recesses 19 has a larger area than that of the emitter region to be formed later, and the depth thereof is about a half of the thickness of the other portion of the silicon dioxide film 18. One of the longer sides 19' of each recess 19 has been made to coincide with the one side of the prospective emitter area. The process up to this stage can proceed exactly in the same way as the process shown in FIGS. 2(*a*) through 2(*c*) by using a glass mask having the dark portions of the same are as that of the recesses 19. Next, as shown in FIG. 4(*b*), rectangular windows 21 are made on the surface of the base region 17 by etching rectangular areas 20 of the silicon dioxide film 18, which areas 20 slightly overlap with the rectangular recesses 19, respectively, in such a manner that they contain the longer sides 19' of the recesses 19, until the silicon dioxide film only at the overlapped portions 21 disappears. The process up to this stage can be carried out exactly in the same way as the process shown in FIGS. 2(*d*) and 2(*e*). The long and narrow windows 21 thus formed determine the areas of emitter regions of the transistor. Referring now to FIG. 4(*c*), an impurity is diffused through the windows 21 into the base region 17 to form emitter regions 22. Then, long and narrow windows 23 are formed in the silicon dioxide film 18 on the base region 17 along the emitter window 21, followed by deposition of an aluminum base electrode 24 thereon and also by deposition of an aluminum emitter electrode 25 in the emitter windows 21. Collector electrode 26 is attached firmly to the back face of the substrate 16. In this example, the elongated narrow emitter windows 21 for two emitters of a transistor can be made equal in width to each other, since the photo-etching process may be carried out by using the same single glass mask having the dark portions of the same area as that of the recesses 19 and by only shifting the position thereof.

In the above embodiments and examples, it is appreciated that reference is made to the case involving a film of silicon dioxide on the silicon substrate. However, it will be understood that the method is applicable to other semiconductors in which the substrate is germanium or intermetallic compounds selected from the elements of the group consisting of Group III–A, IV–A and V–A of the Periodic Table. (Note the Periodic Table on page 505 of The Encyclopedia of Physics, 1966 ed., Reinhold Publishing Corp.) Examples of such compounds are AlAs, AlSb, GaAs, GaSb, InAs, InP, InSb, etc. Also, films other than silicon dioxide film may be used. Further, this invention can also be applied to the selective or partial removal of metal films, such as aluminum or gold, deposited on the silicon dioxide film covering the surface of a semiconductor, and also to the selective or partial removal of metal layers such as copper adhered on an insulating material base plate in the manufacture of printed circuit boards. Thus, the substrate and the thin film formed on the substrate surface which are usable in this invention shall not be restricted to the ones used in the above embodiment. In other words, this invention can be applied to the selective or partial removal of any thin film which is formed on a substrate and which is made of a material different from that of the substrate.

Summarizing the invention, a photo-etching process is provided for removing a predetermined area of a thin film on a substrate, e.g. a semiconductor, the thin film being made of a material different from the material of the substrate. The improvement resides in forming a recess in the thin film of a depth less than the film thickness and of an area larger than the predetermined area to be removed from the substrate such that one edge of the recess coincides with a first part of a boundary of the predetermined area and the rest of the recess contains within it the remaining part of the boundary of the predetermined area to be finally etched. Following the formation of the recess, a selected area of the thin film is etched to remove film material along the edge of the recess coincident with the first boundary part of the predetermined area and also from only that portion of the recess up to remaining boundary part of the predetermined area whereby the film is completely removed from the substrate only within the predetermined area.

In carrying out the process, the thin film is advantageously covered with a photosensitive resin coating which is soluble in a solvent. A selected portion of the resin coating is exposed to light to render it insoluble in the solvent such that when the treated resin coated substrate is dipped in the solvent, the unexposed portion of the resin is removed to expose an area of the thin film in which the recess is produced (note, for example, FIGS. 2(*b*) and 2(*c*)). After the recess is etched out, the thin film is again covered with a photo-sensitive resin coating part of which is selectively removed by the same step of selective exposure, the unexposed portion of the coating being removed by dipping in a solvent as described above, for example, as shown in FIG. 2(*c*). The area finally exposed is selectively etched to remove the thin film from along the recess edge coincident with the first boundary part of the predetermined area and from only that portion of the recess up to the remaining boundary part of the predetermined area (note FIG. 2(*e*)).

Although the present invention has been described in conjunction with preferred embodiments, it is to be understood that modifications and variations may be restored to without departing from the spirit and scope of the invention as those skilled in the art will readily understand. Such modifications and variations are considered to be within the purview and scope of the invention and the appended claims.

What is claimed is:

1. A photo-etching process for removing a predetermined extremely small area of a thin film on a substrate wherein the thin film is made of a material different from the material of the substrate, comprising the steps of:

applying a photosensitive film over the thin film, exposing the photosensitive film to light rays except for a first selected area which coincides at one edge thereof with one edge of the said predetermined area, and then hardening the exposed photosensitive film, removing the unhardened photosensitive film covering the first selected area, etching the first selected area of the thin film by a depth less than the film thickness, applying the photosensitive film over the thin film again, exposing the photosensitive film to light rays, except for a second selected area which coincides at one edge thereof with another edge of the said predetermined area, and then hardening the exposed photosensitive film, removing said unhardened photosensitive film covering the second selected area, and then etching the second area of the thin film until the substrate of only the predetermined area is exposed.

2. The process of claim 1, wherein the substrate is a semiconductor element and wherein the thin film is an oxide coating.

3. The process of claim 2, wherein the semiconductor element is selected from the group consisting of silicon, germanium and intermetallic compounds of elements from the Group III–A, IV–A and V–A of the Periodic Table.

4. The process of claim 3, wherein the thin film is silicon dioxide and wherein the substrate is silicon.

References Cited

UNITED STATES PATENTS

| | | | |
|---|---|---|---|
| 2,854,336 | 9/1958 | Gutknecht | 156—11 |
| 3,212,162 | 10/1965 | Moore | 29—578 |
| 3,312,577 | 4/1967 | Dunster et al. | 29—578 |
| 3,404,451 | 10/1968 | So | 29—578 |
| 3,432,920 | 3/1969 | Rosenzweig | 156—8 |

NORMAN G. TORCHIN, Primary Examiner

J. R. HIGHTOWER, Assistant Examiner

U.S. Cl. X.R.

96—36.2, 36.3; 156—8